Jan. 19, 1960

H. J. BUTLER 2,921,650

DISC BRAKE

Filed Sept. 14, 1954

INVENTOR
Henry James Butler
by Benj. T. Rauber
his attorney

Jan. 19, 1960 H. J. BUTLER 2,921,650
DISC BRAKE

Filed Sept. 14, 1954 3 Sheets-Sheet 2

INVENTOR
Henry James Butler
by Benj. T. Rauber
his attorney

Jan. 19, 1960

H. J. BUTLER
DISC BRAKE 2,921,650

Filed Sept. 14, 1954

INVENTOR.
HENRY JAMES BUTLER
BY
Benj. T. Rauber
ATTORNEY

United States Patent Office 2,921,650
Patented Jan. 19, 1960

2,921,650
DISC BRAKE

Henry James Butler, Sutton Coldfield, England, assignor to Dunlop Rubber Company Limited, London County, England, a British company Application September 14, 1954, Serial No. 455,828

Claims priority, application Great Britain September 22, 1953

13 Claims. (Cl. 188—73)

This invention relates to disc brakes, and more particularly relates to disc brakes for heavy vehicles, rolling stock, industrial machinery and the like.

Disc brakes for heavy vehicles and the like must necessarily have a high torque capacity and they should also be of robust construction and be capable of easy maintenance.

My present invention provides a disc brake which fulfills these requirements.

According to the invention a disc brake comprises a rotatable disc, a non-rotatable bracket located adjacent the outer periphery of the disc, two pad retaining members extending radially inwardly from each end of said bracket and spaced circumferentially apart, a pad of friction material adjacent each side of the disc and located by said pad retaining members, a member extending radially inwardly from said bracket on each side of said disc between said pad retaining members and an actuating mechanism supported on said last-mentioned member for forcing the pads of friction material into frictional contact with the sides of the disc.

Preferably the bracket is so constructed that a part thereof may be readily removed to allow easy access to the friction pads, so that they may be replaced when worn. Preferably also the actuating mechanism is fluid pressure operated and is substantially isolated from the bracket to prevent transmission of heat therefrom when the brake is applied.

The invention will now be described with reference to the accompanying drawings of which:

Figure 1:
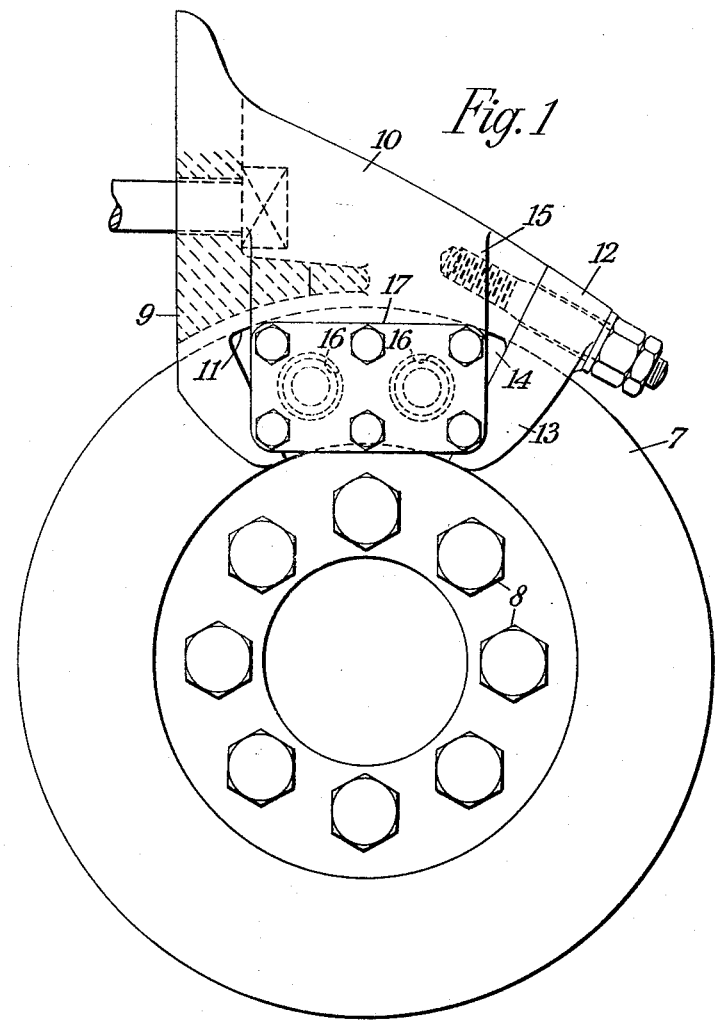
Figure 1 is a side elevation of a disc brake constructed according to the invention.
Figure 2:
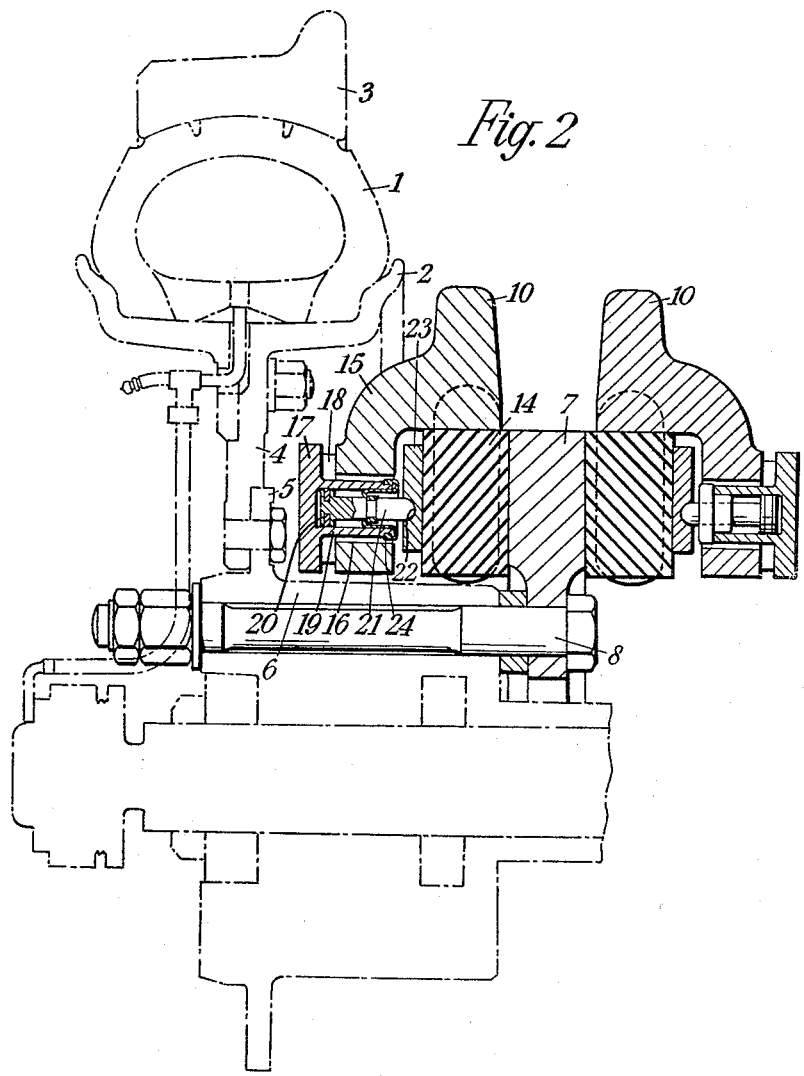
Figure 2 is a sectional view on the line 2—2 of Figure 1.
Figure 3:
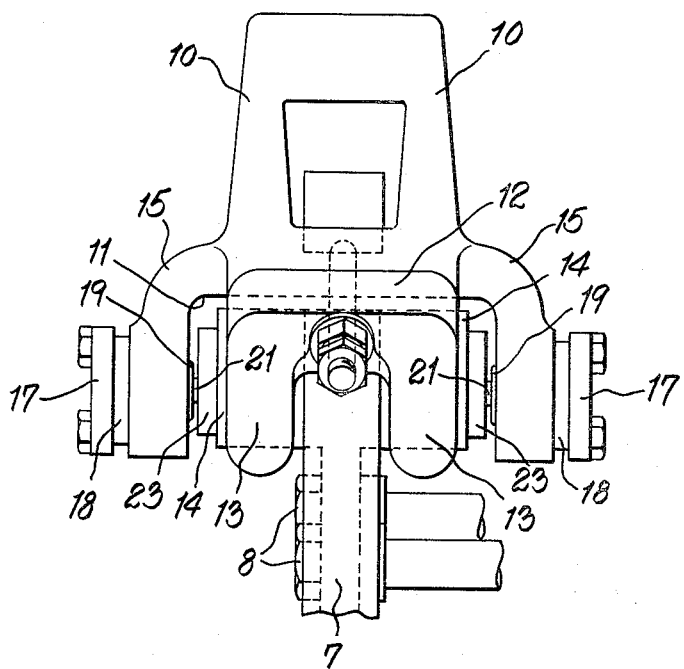
Figure 3 is an end elevation of the disc brake shown in Figure 1.

In one embodiment of the present invention (Figures 1 and 2) a disc brake assembly is provided for a railway carriage wheel. The wheel is provided with a pneumatic tire 1, and comprises a rim 2 to seat the tire and an annular member 3 secured to the outer periphery of the tire and flanged at one side to run on the railway lines. The rim is provided with an inwardly extending web 4, the inner periphery of which is bolted to an annular flange 5 extending outwardly from one end of a hub 6 which is rotatable on bearings on a fixed axle.

An annular brake disc 7 is secured at its inner periphery to the other end of said hub 6 by a plurality of equispaced nut and bolt assemblies 8 which extend axially through the hub. The disc thus rotates with the wheel.

A bracket, comprising a base 9 having two parallel arms 10 extending from one side thereof, is non-rotatably secured to a fixed support, e.g. a part of the railway carriage, adjacent the upper portion of the disc. The base 9 of the bracket is rectangular in shape and it is vertically disposed and aligned with the median plane of the disc. A portion of the base is bifurcated to straddle the disc and this extends downwardly to a location axially aligned with the inner periphery of the braking surfaces of the disc.

The two parallel arms 10 of the base, extend substantially tangentially adjacent the outer periphery of the disc 7 with their adjacent sides substantially radially aligned with the braking surfaces thereof. One side of each arm 10, i.e. that presented towards the center of the disc, is curved to the outer periphery of the disc as shown at 11 and is axially aligned therewith.

A bridge-piece 12 is secured to the ends of the arms 10 remote from the base, and said bridge piece is provided with two legs 13 each of which extends radially across the braking surfaces of the disc to a location adjacent the inner periphery thereof.

A segmental pad of friction material 14 is slidably located in the space on each side of the disc between the leg 13 of the bridge piece 12, the curved side of the arm 10 and the bifurcated part of the base, which is shaped to accommodate a radially-extending side of said pad. Each pad is axially slidable relative to the disc.

Integral with each arm 10 of the bracket is a rectangular member 15, parallel with the disc, which extends axially outwardly a short distance away from said arm and then radially inwardly (Figure 2) to a location in line with the inner periphery of the braking surfaces of the disc. Each member 15 is provided with two holes 16 in side-by-side relationship extending axially therethrough, said holes being aligned substantially intermediate the inner and outer peripheries of the braking surfaces of the disc.

A rectangular plate 17 is secured through spacing members 18 to the side of each member 15 remote from the disc and each plate 17 has two cylinders 19 integral therewith which extend through the holes 16 in the member and are spaced away from the sides of said holes. The open end of each cylinder is presented toward the disc and the closed end thereof is connected to a source of fluid pressure. A piston 20 is fluid-tightly slidable in each cylinder 19, each piston being provided with a stem 21 projecting outwardly of the cylinder. The end of said stem is rounded and seats in a complementary shaped recess 22 in a pressure plate 23 which abuts the adjacent side of the friction pad 14. A rubber boot 24 is fitted between the open end of each cylinder 19 and the associated piston stem 21 to prevent dirt and the like from entering the cylinder.

The brake operates as follows. On pressurizing the space between the piston 20 and the base of each cylinder 19 the piston is moved inwardly towards the disc and, acting through the stem 21 and pressure plates 23, moves the associated pad of friction material 14 into frictional engagement with the braking surfaces of the disc, thus squeezing the disc between the two friction pads and decelerating the disc and hence the wheel.

The leading edge of each pad 14 may wear at a greater rate than the trailing edge or vice versa and the pivotal connection between the pressure plates 23 and piston stems 21 allow each pressure plate to tilt, relative to the disc, so that the pressure applied through each pair of adjacent piston stems is equally distributed. Alternatively each pressure plate may be articulated to allow this to take place.

The cylinders are substantially isolated from the parts of the brake which might heat up during the braking operation, thus preventing a rise in temperature of the hydraulic liquid and possible damage to the piston seals.

A feature of the invention is the ease with which the brake may be maintained. For example, to renew the friction pads it is only necessary to remove the bridge-piece, when the old pads can be slid out and new ones inserted. The entire brake can easily be removed from the disc by detaching the base of the bracket from the fixed support, and lifting the entire brake clear of the disc.

Two or more brake-applying mechanisms, as described above, may be fitted to a single disc, or alternatively the brake may comprise more than one disc.

Having now described my invention, what I claim is:

1. A disc brake comprising a rotatable disc; a pair of pads of friction material, one on each side of said disc and covering only a portion of the face of said disc, each said pad being movable to and from the opposed face of the disc; a non-rotatable bracket comprising a portion adjacent to and extending over a limited length of the periphery of said disc and also comprising parts adjacent each of the opposite faces of said disc and engaging side faces of said pad to prevent movement of said pad parallel to the plane of said disc and to form a guide for movement of each said pad to and from its opposed face of the disc, one of said parts being removable to permit withdrawal of said pad in a direction parallel to the face of said disc, said parts comprising a pair of spaced elements extending from said peripheral facing portion of said bracket over the adjacent face of the disc on opposite side edges of each said pad; a motor support on each side of the disc mounted on said bracket and extending over the friction pad on its side of said disc, and an actuating means mounted on each said support and bearing against its respective pad to force said pad into engagement with the opposed side of the disc.

2. The disc brake of claim 1 wherein one of each pair of circumferentially-spaced pad-retaining members comprises an arm integral with a portion of said bracket adapted to be secured to a non-rotatable member and the other of each said pair of pad-retaining members is detachably secured to said bracket.

3. The disc brake of claim 1 wherein each mounting member has an aperture and said brake actuating mechanism comprises a piston and cylinder mechanism disposed in said aperture, each said piston having a round ended stem, and a pressure plate for each said friction pad having a mating recess for the rounded end of said stem, said mounting members being integral with the portion of the bracket secured to the non-rotatable bracket and parallel with and adjacent the braking surfaces of said disc.

4. The disc brake of claim 3 in which said piston and cylinder mechanism is of smaller diameter than said aperture to form an air gap between said mechanism and said mounting member.

5. A disc brake comprising a rotatable disc; a pair of friction elements, one on each side of said disc and covering only a portion of the braking surfaces of said disc, each of said elements having a pair of sides transverse to the direction of movement of the disc; a stationary torque-resisting member having components to prevent movement of said friction element parallel to said disc and including a pair of U-shaped components straddling said disc and held in circumferentially spaced position with the legs of said U-shaped components on each side of and spaced closely from said disc, abutting the transverse sides of said friction elements to guide said elements in movement to and from said disc and to restrain said elements from movement parallel to said disc; said torque-resisting member comprising a support on each side of said disc extending over the space between the legs of said component and over said friction element, said friction element being between said support and said disc; and means mounted on said support to move said friction element to and from said disc; at least one of the components of said torque-resisting member being removable to permit said friction element to be removed in a plane parallel to said disc.

6. The disc brake of claim 5 in which said torque-resisting member comprises a bridge piece beyond the periphery of the disc and joining said U-shaped components and said supporting members extend inwardly from said bridge piece toward the axis of said disc.

7. The disc brake of claim 6 in which one of said U-shaped components is detachably secured to said bridge piece.

8. The disc brake of claim 5 in which said means to move said friction element comprises a cylinder on said support and a piston having an extension to abut said friction element.

9. A disc brake comprising a rotatable disc; a non-rotatable torque-resisting member having a pair of extensions on each side of said disc extending transversely of the periphery of said disc and spaced circumferentially of said disc to provide a space for retaining a friction element from displacement parallel to the plane of the disc in the direction of rotation of the disc and to permit axial movement of the friction element to and from the surface of the disc, a pair of friction elements in said space between said extensions and a pressure applying means on each side of said disc supported by said torque-resisting member axially outward of the friction element on its side of the disc to force said friction elements into frictional engagement with opposite sides of the disc, one of said extensions on each side of said disc being detachable to permit removal of said friction element in a direction parallel to a tangent to said disc.

10. The disc brake of claim 9 in which said extensions extend radially inwardly.

11. The disc brake of claim 9 in which said pressure applying means comprises a cylinder supported by said torque-resisting member and a piston engaging a friction element.

12. A disc brake comprising a rotatable disc, a non-rotatable bracket located adjacent the outer periphery of the disc, a pair of circumferentially spaced retaining members extending radially inwardly from said bracket on each side of said disc, a pad of friction material adjacent each side of said disc and slidingly located between cooperating pairs of said pad retaining members, a brake actuating mechanism for the pad on each side of said disc positioned to press each associated pad towards the adjacent side of said disc, and a mounting member for each said brake actuating mechanism extending radially inwardly from said bracket substantially medially of the circumferentially spaced pad retaining members, said circumferentially spaced pad retaining members each comprising an arm integral with a portion of said bracket and a circumferentially spaced arm detachably secured to said bracket.

13. A disc brake comprising a rotatable disc; a pair of friction elements, one on each side of said disc and covering only a portion of the braking surfaces of said disc, each of said elements having end portions transverse to the direction of movement of the disc and providing bearing surfaces on which said elements are slidably supported; a stationary torque-resisting member having at least three components holding said friction elements from movement in a plane parallel to said disc, and at least one of said components being displaceable to permit removal of said friction elements in a plane parallel to said disc and a pair of said components being held in axially spaced positions on each side of and closely spaced from said disc and having surfaces transverse to the direction of rotation of said disc and placed complementarily to the transverse end portions of said friction elements to guide said elements at their opposite ends in movement to and from said disc and to restrain said elements from circumferential movement parallel with said disc; and means to move said friction elements toward said disc, each of said friction elements being between said means and said disc.

(References on following page)

References Cited in the file of this patent

UNITED STATES PATENTS

| | | |
|---|---|---|
| 2,174,396 | McCune | Sept. 26, 1939 |
| 2,479,085 | Schrage | Aug. 16, 1949 |
| 2,496,699 | Clark | Feb. 7, 1950 |
| 2,575,578 | Bricker | Nov. 20, 1951 |
| 2,612,968 | Hood | Oct. 7, 1952 |
| 2,657,772 | Chamberlain | Nov. 3, 1953 |
| 2,682,320 | Chamberlain et al. | June 29, 1954 |
| 2,754,936 | Butler | July 17, 1956 |
| 2,799,367 | Dotto | July 16, 1957 |

FOREIGN PATENTS

| | | |
|---|---|---|
| 158,496 | Australia | Aug. 26, 1954 |
| 688,382 | Great Britain | Mar. 4, 1953 |